(12) United States Patent
Benz

(10) Patent No.: US 10,909,867 B2
(45) Date of Patent: Feb. 2, 2021

(54) STUDENT ENGAGEMENT AND ANALYTICS SYSTEMS AND METHODS WITH MACHINE LEARNING STUDENT BEHAVIORS BASED ON OBJECTIVE MEASURES OF STUDENT ENGAGEMENT

(71) Applicant: MF Genius, Corp., Austin, TX (US)

(72) Inventor: Aaron Benz, Austin, TX (US)

(73) Assignee: MF Genius, Corp., Austin, TX (US)

( * ) Notice: Subject to any disclaimer, the term of this patent is extended or adjusted under 35 U.S.C. 154(b) by 491 days.

(21) Appl. No.: 15/941,713

(22) Filed: Mar. 30, 2018

(65) Prior Publication Data

US 2018/0293905 A1 Oct. 11, 2018

Related U.S. Application Data

(60) Provisional application No. 62/481,940, filed on Apr. 5, 2017.

(51) Int. Cl.
*G09B 5/00* (2006.01)
*G06N 20/00* (2019.01)
*G09B 19/00* (2006.01)
*G06N 5/00* (2006.01)

(52) U.S. Cl.
CPC ............... *G09B 5/00* (2013.01); *G06N 5/003* (2013.01); *G06N 20/00* (2019.01); *G09B 19/00* (2013.01)

(58) Field of Classification Search
None
See application file for complete search history.

*Primary Examiner* — James B Hull
(74) *Attorney, Agent, or Firm* — Sprinkle IP Law Group

(57) ABSTRACT

Embodiments leverage wireless data passively collected by access points of a school to correlate a student's behavior with respect to time and place. This data-driven approach can quantify student behaviors and objectively measure and track how students move and interact on campus. For example, if a student accesses a wireless router that is in the same physical location as a class on the student's schedule at the time the class takes place, the correlated time and place quantifies how the student behaves with respect to class attendance. The invention takes the sum of such interactions (e.g., attending classes, studying in the library, etc.) and produces a student engagement score (SES) for each student. The SES is evaluated to determine how student behaviors change over time (e.g., throughout a semester) and whether the student is trending to a low engagement score and thus "at-risk" of dropping out.

20 Claims, 15 Drawing Sheets

| school_id | semester_id | id | day_of_week | end_time | start_time |
|---|---|---|---|---|---|
| 7630dd20-e2c7-48fd-aab8-5c4c... | f75412c8-5395-40fa... | 00bde299-f0ca-4630... | 1 | 740 | 675 |
| 7630dd20-e2c7-48fd-aab8-5c4c... | f75412c8-5395-40fa... | 00bde299-f0ca-4630... | 2 | 770 | 720 |
| 7630dd20-e2c7-48fd-aab8-5c4c... | f75412c8-5395-40fa... | 00bde299-f0ca-4630... | 3 | 740 | 675 |
| 7630dd20-e2c7-48fd-aab8-5c4c... | f75412c8-5395-40fa... | 00bde299-f0ca-4630... | 5 | 740 | 675 |
| 7630dd20-e2c7-48fd-aab8-5c4c... | f75412c8-5395-40fa... | 0a3c3deb-9100-48a4... | 1 | 590 | 540 |
| 7630dd20-e2c7-48fd-aab8-5c4c... | f75412c8-5395-40fa... | 0a3c3deb-9100-48a4... | 2 | 590 | 540 |
| 7630dd20-e2c7-48fd-aab8-5c4c... | f75412c8-5395-40fa... | 0a3c3deb-9100-48a4... | 3 | 590 | 540 |
| 7630dd20-e2c7-48fd-aab8-5c4c... | f75412c8-5395-40fa... | 0a3c3deb-9100-48a4... | 4 | 590 | 540 |
| 7630dd20-e2c7-48fd-aab8-5c4c... | f75412c8-5395-40fa... | 0a3c3deb-9100-48a4... | 5 | 590 | 540 |

*FIG. 4A*

| school_id | semester_id | id | zone_id |
|---|---|---|---|
| 7630dd20-e2c7-48fd-aab8-5c4c... | f75412c8-5395-40fa-8e6e-fb7e1... | 00bde299-f0ca-4630-9246-609e... | 7feb20a5-86da-40b6-9795-fa03a... |
| 7630dd20-e2c7-48fd-aab8-5c4c... | f75412c8-5395-40fa-8e6e-fb7e1... | 0a3c3deb-9100-48a4-9ef1-edcb... | 17497e15-ff05-4ddf-8ef5-bc3e5... |
| 7630dd20-e2c7-48fd-aab8-5c4c... | f75412c8-5395-40fa-8e6e-fb7e1... | 0ad3c74d-8ebc-4d2a-a747-4782... | 0421c942-550e-48f3-a5b2-0700... |
| 7630dd20-e2c7-48fd-aab8-5c4c... | f75412c8-5395-40fa-8e6e-fb7e1... | 0ad3c74d-8ebc-4d2a-a747-4782... | 28766b67-14aa-49a6-899f-a4efd... |
| 7630dd20-e2c7-48fd-aab8-5c4c... | f75412c8-5395-40fa-8e6e-fb7e1... | 0ad3c74d-8ebc-4d2a-a747-4782... | 341443ed-1619-4a52-b1aa-b265... |
| 7630dd20-e2c7-48fd-aab8-5c4c... | f75412c8-5395-40fa-8e6e-fb7e1... | 0ad3c74d-8ebc-4d2a-a747-4782... | 4e73e5b3-1e06-4ea7-89ce-8dbe... |
| 7630dd20-e2c7-48fd-aab8-5c4c... | f75412c8-5395-40fa-8e6e-fb7e1... | 0ad3c74d-8ebc-4d2a-a747-4782... | 52634929-a184-4bfd-b021-05d0... |

*FIG. 4B*

STUDENT ENGAGEMENT AND ANALYTICS SYSTEMS AND METHODS WITH MACHINE LEARNING STUDENT BEHAVIORS BASED ON OBJECTIVE MEASURES OF STUDENT ENGAGEMENT

CROSS-REFERENCE TO RELATED APPLICATION(S)

This application claims a benefit of priority under 35 U.S.C. § 119(e) from U.S. Provisional Application No. 62/481,940, filed Apr. 5, 2017, entitled "SYSTEM AND METHOD FOR ANALYZING ENGAGEMENT OF STUDENTS USING SENSOR DATA TO PREDICT AND UNDERSTAND STUDENT RETENTION IN A REAL-TIME AND OBJECTIVE MANNER," which is fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to educational data analytics and machine learning. More particularly, embodiments disclosed herein relate to student engagement and analytics systems and methods with machine learning student behaviors based on objective measures of student engagement, useful for objectively and accurately quantifying student behaviors as a predictor of student retention in higher education settings such as universities and colleges.

BACKGROUND OF THE RELATED ART

College student retention is a current challenge, with thirty three percent of first year US college students not returning for their second year. Ninety eight percent of US college institutions lose students having a 2.0 grade point average (GPA) or higher, with forty four percent having a GPA of 3.0 or higher, showing that there are factors other than academic achievement for student retention. Research has shown that students who interact more with other students and school staff are more likely to stay in school. Studies have also shown that notifications combined with early at-risk detection can be successful in moving a student from high to low risk of dropping out. Unfortunately, schools often do not have enough resources to identify, track, and help all the students who are disengaging or at risk of disengaging from their schools.

Generally, class attendances can be observed by teachers and potentially used by schools to identify those who may be at risk of dropping out. However, for this method to be reliable, every teacher must proactively take accurate attendance records for every class day after day, week after week, and month after month, even for classes with hundreds of students. In higher education settings, it is not realistic to expect every teacher to take accurate attendance records for every class every time. Further, class attendances do not account for other types of on-campus student behaviors such as facility usages. The manual efforts to take and record student class attendances and their facility usages on every campus can be extremely difficult, inefficient, inadequate, costly, and slow.

Schools not only lack the resources and technologies to track the on-campus activities of all of their students, but they also have no objective ways to measure student engagements. That is, even with the advances in today's computing technologies, institutions in higher education settings such as colleges and universities still do not have an effective and reliable technological tool that can help them to timely identify students who may be at risk of dropping out and take preventative measures to help those students return to school or graduate successfully.

One existing method to identify students who may be at risk of dropping out of a school relies on correlating a student's historical data, such as high school grades, ACT/SAT scores, race, gender, and current grades, with data collected from students of the past. Although such historical data can provide schools with early insights into potentially at-risk students, it cannot predict or provide insight into what students are actually doing or will be doing during the semester or academic year. Further, the collection of such historical data relies on data sources that may be prejudiced by geographical locations (e.g., zip code, race, gender, etc.), delayed (e.g., grades are not often submitted on time), or subjective (e.g., surveys taken by humans). Additionally, the correlation between a student's historical data and data collected from past students is fixed, so it does not reflect, nor can it be adjusted to reflect, a student's current at-risk profile which may change on a day-to-day basis.

In view of the foregoing, there is a need for innovations and improvements in quantifying and analyzing student engagement in higher education settings and timely and objectively identifying students who are at risk of dropping out of a school so that preventative and/or proactive measures can be taken to increase student retention and help those students return to school or graduate successfully. Embodiments disclosed herein can address this need and more.

SUMMARY

Embodiments disclosed herein can address the aforementioned drawbacks and provide technical solutions and benefits. An object of the invention is to, based on objective data and analyses thereof, quantify student behavior and accurately identify students that are at risk of dropping out of school based on derived behavior. Embodiments disclosed herein provide a new system, method, and computer program product for realizing this object and addressing the aforementioned need for innovations and improvements in quantifying and analyzing student engagement in higher education settings.

More specifically, embodiments disclosed herein provide a methodology that leverages student activity data that can be passively observed, processed, and measured by a machine (e.g., a computer with data processing capabilities), the results (referred to herein as "objective measures") of which can be used by the machine to learn about a student's on-campus behaviors and, based on the learned knowledge of past and present on-campus student behaviors, produce a quantified, data-driven output representing the student's level of engagement (e.g., a student engagement score). Utilizing the student engagement score, the machine can reliably predict whether or not the student is presently (e.g., on the same day or week the student's activity data was processed) at risk of dropping out of school. The machine can automatically generate a report and send the report (e.g., by email) to an authorized user (e.g., a school counselor) to report the student's current levels of engagement and retention risk. Additionally or alternatively, the machine can automatically update an authorized user's dashboard (e.g., a user interface of a student engagement application running on the machine) in real time to reflect the student's current levels of engagement and retention risk. In this way, the machine's student engagement analyses and outputs can aid in the early detection of at-risk student engagement which, in turn, can be used to increase student retention for a college.

In some embodiments, a student engagement system implementing the methodology may include a data processor, a student engagement analyzer, a data store, a student behavior machine learning module, and an at-risk student engagement detector. In some embodiments, the student engagement system may further include a student engagement application and a report generator.

In some embodiments, the data processor is configured for processing local area networking data provided by (e.g., received or obtained from) a school (which can have one or more campuses). As an example, the data processor may operate to process and transform raw local area networking data into an internal data structure (a data set). At any given day, the data processor may generate hundreds or thousands of such data sets for a student.

The data sets produced by the data processor can be used by the student engagement analyzer. Because a data set associated with a student is also associated with a physical location and has a timestamp, each data set can be used by the student engagement analyzer to establish the student's location at a precise time. For example, in some embodiments, the student engagement analyzer can operate to correlate the data sets produced by the data processor with the student's class schedules and a map that contains the location information for all the physical locations of school facilities (at one or more campuses). This correlation may entail extracting values from certain attributes in the data sets, for instance, location information, device identifier, and timestamp, matching the location information to a physical location in the map, matching the device identifier to a student, matching the timestamp to the student's class schedule, etc. The results from the correlation can be used by the student engagement analyzer to update student behavior variables, each representing a particular student behavior, for instance, how many hours a particular student attended classes in a day or week, how many hours a day or week that student spent in a library, whether that student attended an orientation event and, if so, how long, etc.

Using machine learning (ML), the student behavior machine learning module is operable to determine the importance of each student behavior and construct a student-specific score indicative of a student's level of engagement (a student engagement score). The student-specific score can be a daily student engagement score that gives a quantified insight into how a student is behaving on a campus on that day. Student engagement scores thus generated by the student behavior machine learning module can be stored in the data store and utilized to track individual student engagement as well as student group engagement over time (e.g., a week, a month, a semester, etc.), generate student engagement reports, and/or update the dashboards student engagement application in real time.

In some embodiments, the at-risk student engagement detector can operate to compare student engagement scores with how students have behaved in the past to understand how students will behave in current time and in the future. To do so, the at-risk student engagement detector may utilize ML techniques to generate predictive student engagement scores. Features can then be derived from the current predicted student engagement scores to generate thresholds for at-risk student retention.

In this way, predictions on student engagement can be generated in real-time and the predictions thus generated can account for different subgroups of students who naturally have different behavioral patterns. For example, students who live on campus versus students who commute may have different experiences, behaviors, and outcomes. Even with these vast differences, embodiments disclosed herein can analyze and predict which students are at risk relative to all the subgroups (on campus vs commuter) with which a student may be associated.

Furthermore, embodiments disclosed herein can measure the change in a student's engagement score and use the change to forecast future behavior of that student. That is, unlike traditional methods that rely on specific events such as mid-term grades or previous history, embodiments disclosed herein can systematically adjust and update student risk profiles in real time. Embodiments disclosed herein thus can provide meaning to the massive set of wireless local area networking data and make real-time assessment of day-to-day changes of student risk possible.

One embodiment may comprise a system having a processor, a memory, and a configuration to implement the method. One embodiment may comprise a computer program product that comprises a non-transitory computer-readable storage medium which stores computer instructions that are executable by a processor to perform the method. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 2 shows an example portion of raw local area networking data contained In a wireless network log file.

FIG. 3 shows an example portion of an access point data set processed from the raw local area networking data.

FIG. 4A is an example of a behavior time table generated by a student engagement and analytics platform component according to some embodiments.

FIG. 4B is an example of a behavior zone table generated by a student engagement and analytics platform component according to some embodiments.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As discussed above, generally, schools lack the resources, particularly technological tools, to objectively understand how their campus (students as a whole) behaves. Rather, school administrators and counselors alike rely on their intuitions, or in some cases, on surveys in committee meetings that determine the allocation of campus resources with respect to student retentions. Such surveys, by nature, receive poor response rates. More importantly, surveys can be biased by a surveyor's ability to ask appropriate and effective questions to solicit meaningful responses. Further, surveys can also be biased by a responder's subjective interpretation of the questions.

Embodiments disclosed herein are directed to a new student engagement approach that does not rely on human intuitions or experiences, manual efforts (e.g., teachers taking class attendances), or subjective measures such as surveys. Rather, the new student engagement approach leverages a deep understanding of passively and automatically aggregated wireless local area networking data to identify students, derive student behaviors driven by their respective activity data, weigh student behaviors by their individual impact, generate a student-specific engagement score and prediction, and timely and accurately detect at-risk student engagement.

Figure 1:
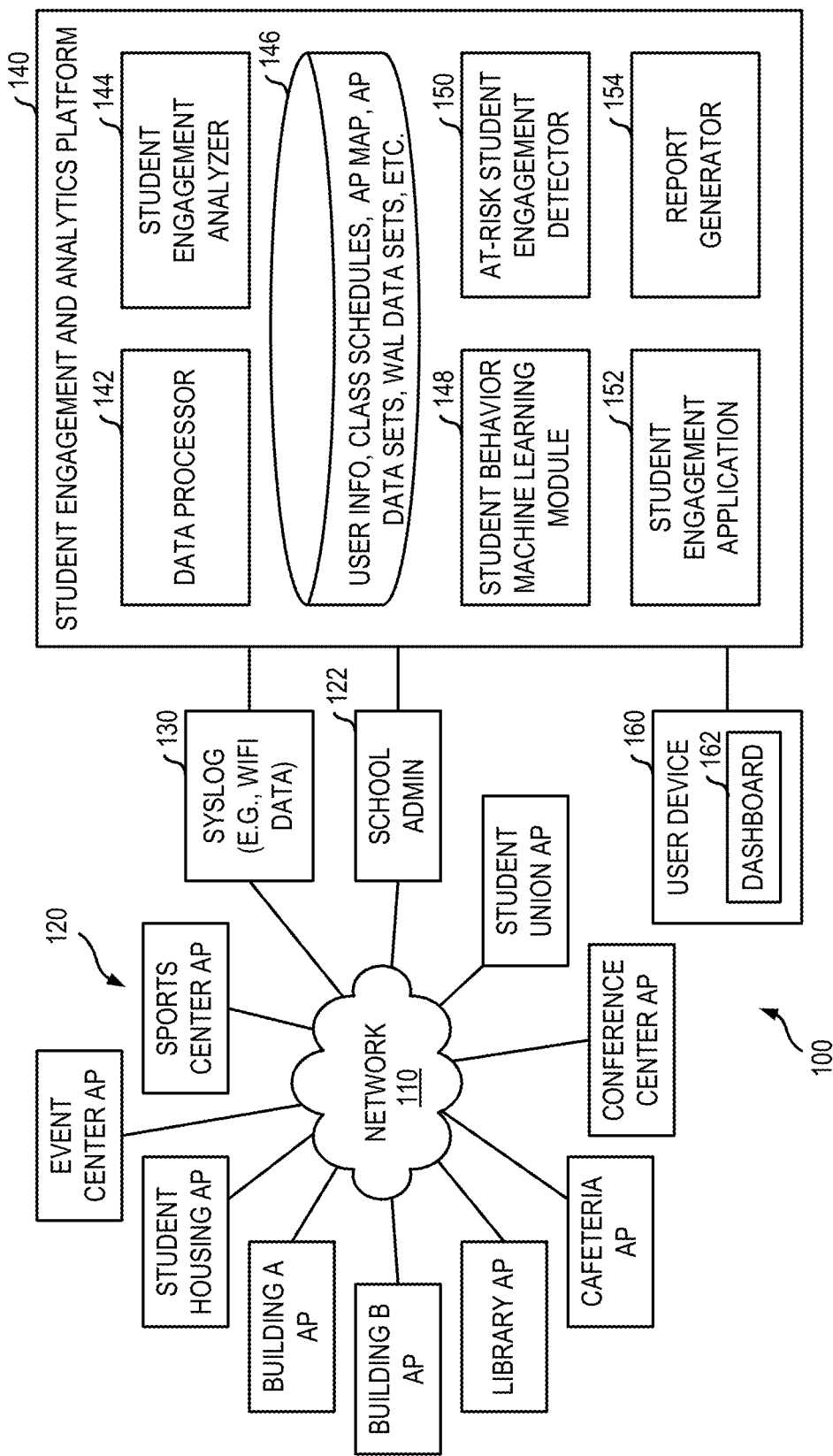
FIG. 1 depicts a diagrammatic representation of a distributed computing environment where the new student engagement approach disclosed herein can be implemented on a student engagement and analytics platform according to some embodiments.

FIG. 1 depicts a diagrammatic representation of a distributed computing environment where the new student engagement approach disclosed herein can be implemented.

In some embodiments, a distributed computing environment 100 comprises of a network 110 for higher education institutions such as a college or a university (referred to hereinafter as the school). As illustrated in FIG. 1, a network 110 can digitally connect school facilities (e.g., class buildings, library, cafeteria, student housing, event center, sports center, student union, conference center, school administrative buildings, etc.) located on one or more campuses through Ethernet cables and wireless access points (WAPs).

In computer networking, a WAP or access point (AP) is a networking hardware device that allows Wi-Fi devices to connect to a wired local area network known as Ethernet. An AP usually connects to a router as a standalone device or is integrated with a router.

As discussed above, class attendances can be observed by teachers and potentially used by schools to identify those who may be at risk of dropping out. However, realistically, higher education teachers cannot be relied upon to take accurate attendance records for all of their classes and all of their students all the time. One way to solve this data accuracy problem is to measure class attendances passively, leveraging wireless local area networking data (e.g., Wi-Fi data) automatically collected by a school's APs. Wi-FI or WiFi refers to a technology for wireless local area networking with devices based on the IEEE 802.11 standards. The Wi-Fi technology allows computers, smartphones, or other mobile devices to connect to the Internet or communicate with one another wirelessly within a particular area.

In this disclosure, wireless local area networking data pertaining to a student's device(s) can be correlated with the student's schedule of classes to verify whether the student was indeed attending the classes. The same correlation technique can be used to objectively observe and quantifiably measure other types of student behaviors, for instance, the student's time spent at the library, cafeteria, student union, dorm, gym, orientation session, or any campus building and/or event. In this way, a full picture of that student's on-campus activities can be constructed based on objective measures.

Figures 2, 3:
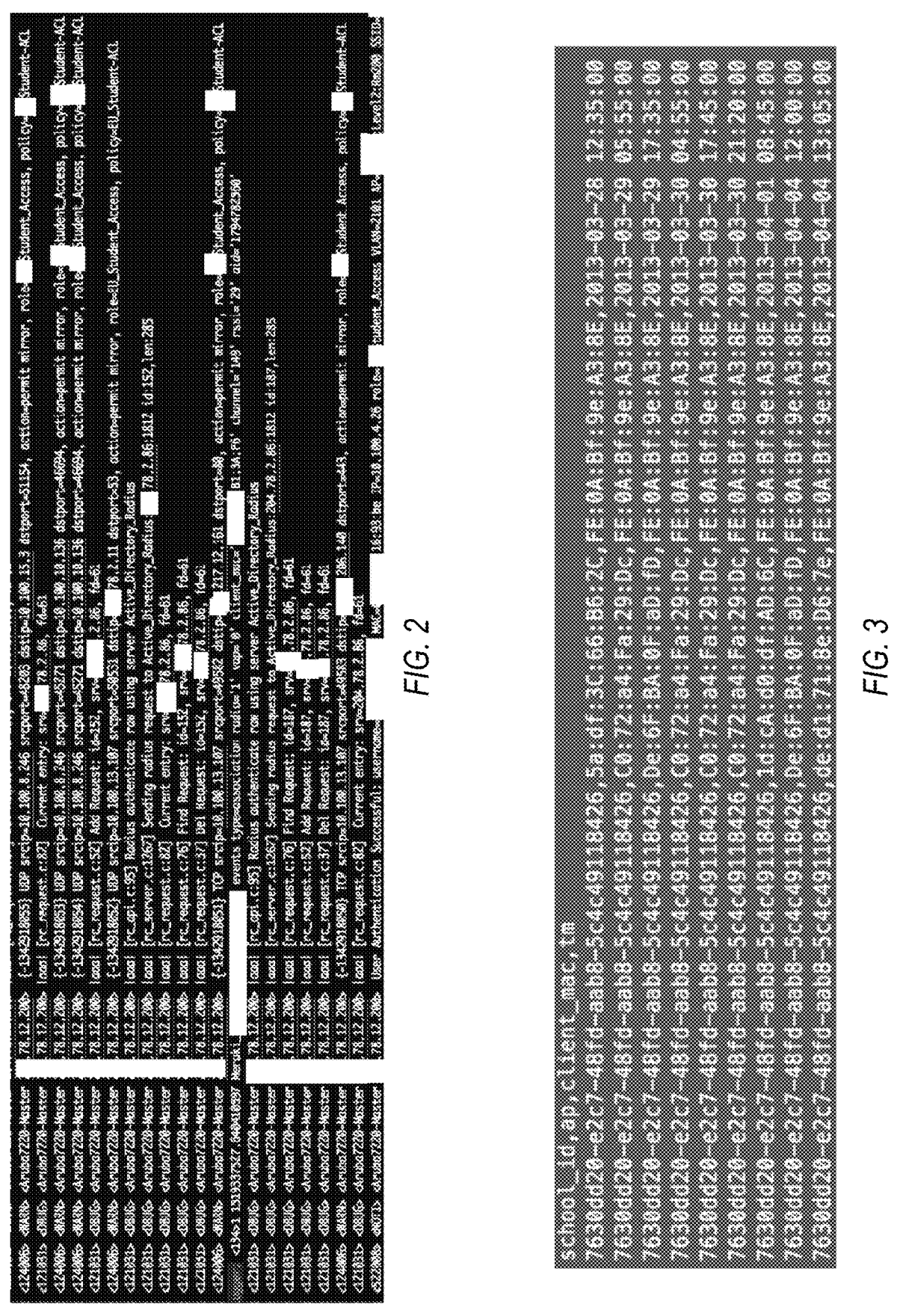

A server computer on network 110 can store wireless local area networking data from the school's APs 120 into a system log file (e.g., event log or syslog 130). FIG. 2 shows an example portion of raw input data contained in a system log file.

Due to the massive amount of wireless local area networking data that may be aggregated in a school's network (e.g., 50 terabytes of network data aggregated for one school in one day, over a trillion of lines in Wi-Fi access logs in a school year, etc.) and the type of information contained therein, it is not possible for humans to manually analyze wireless local area networking data in real time, with pure mental power or with pen and paper. Only machines (e.g., computers with data processing capabilities) have the capacity and capability to analyze aggregated wireless local area networking data in real time or near real time. Such machines can include algorithmic processors (which are problem-solving computer programs) configured for running a variety of algorithms on massive sets of wireless local area networking data.

Referring to FIG. 1, in some embodiments, such problem-solving computer programs operate on a computing platform particularly configured for student engagement and analytics, referred to herein as student engagement and analytics platform or platform 140. In some embodiments, platform 140 can comprise hardware, software, or a combination thereof. Specifically, as illustrated in FIG. 1, platform 140 can include data processor 142, student engagement analyzer 144, data store 146, student behavior machine learning module 148, and at-risk student engagement detector 150. In some embodiments, platform 140 can further include student engagement application 152 and report generator 154. Some or all of the software components (e.g., problem-solving computer programs) of platform 140 may reside on a single server computer or be distributed across server computers. Further, some or all of the software components of platform 140 may be implemented as part of a larger program (e.g., a student engagement analytics system).

In some embodiments, platform 140 may process raw input data contained in syslog 130 and provide outputs to school administrators 122 or authorized users (e.g., a school counselor, student adviser, coach, retention specialist, etc.) through dashboard 162 running on user device 160. Other delivery mechanisms such as emails or a web-based portal to student engagement application 152 can also be implemented. Outputs generated by platform 140 can be utilized in generating a report by report generator 154 and send out by email on a daily, weekly, or monthly basis and/or used to update dashboard 162 in real time.

Syslog 130 can be provided by the school (e.g., received or obtained from the school's network server). As explained below, syslog 130 may contain wireless local area networking data from APs 120 of the school. This is the raw input data. In some embodiments, data processor 142 is configured for processing the raw input data contained in syslog 130.

As exemplified in FIG. 2, the raw input data contained in syslog 130 may not have any context or semantic meaning as wireless local area networking data is not in any natural human language. Further, lines in the raw input data may vary in lengths and the type of network traffic information logged may differ from AP to AP. For example, different types of Wi-Fi logs such as Wi-Fi Access Logs (WALs) and Wi-Fi Routing Logs (WRLs) may store different types of information. A WAL establishes a session of a client device connecting to an AP. Thus, a WAL establishes what MAC address belongs to what client device. The AP belongs to a physical Wi-Fi router. A WRL contains the timestamp, the MAC Address of the accessing device, and the AP belonging to the physical Wi-Fi router. Essentially, a WRL keeps track of every time a user sends a request to the web (i.e., when a user is said to "visit" a website). Because every AP belongs to a Wi-Fi router, every AP is located at a particular longitude-latitude location. Knowing the location of all of the routers, WALs and WRLs can provide the context to the locations of a particular client device relative to time. For example, if a client device is accessing a wireless network from a particular AP, and that AP is part of a router in the library, a user of the client device can be considered to be in or near the library at the timestamp available in the WAL/WRL.

Generally, Wi-Fi information is not considered location information—the Wi-Fi logs do not contain geocodes that identify the physical locations of wireless devices connecting to the APs. Rather, each wireless device automatically sends out network packets to locate AP points nearby. An AP collects the network packets sent from such wireless devices. If a wireless device can communicate with an AP by passing network packets between the device and the AP, it is associated with that AP. Accordingly, a wireless device does not have to be active (e.g., a student does not have to actively log in to network 110) for the AP to collect data from the wireless device.

Although Wi-Fi routers and Wi-Fi network systems vary depending on their setups, their wireless logs all contain the following attributes/fields:

srcip: The source network address (e.g., the Internet Protocol or IP address) of a Wi-Fi router that is being accessed.

dstip: The destination network address (e.g., the IP address) of a client device connecting to the Wi-Fi router.

timestamp: The time, generally in Unix Time, that the wireless log was created. Unix Time refers to a system for describing a point in time, defined as the number of seconds that have elapsed since 00:00:00 Coordinated Universal Time (UTC), Thursday, 1 Jan. 1970, minus the number of leap seconds that have taken place since then.

Here is an example of one such wireless log:
<124006><WARN>|authmgr| 2018-03-25 12:17:00 {302574895} TCP srcip=10.100.3.37 srcport=50035 dstip=204.93.33.8 dstport= . . . .

Another important piece of data is the device address (e.g., media access control (MAC) address) of the client device. While IP addresses are associated with networking software such as the Transmission Control Protocol (TCP)/IP, MAC addresses are linked to the hardware of network adapters. That is, a MAC address is assigned by a manufacturer to a network adapter when the network adapter (e.g., a network interface card (NIC)) was manufactured. It is hardwired or hard-coded onto the NIC and is a unique identifier to the NIC of the client device.

If the client device's MAC address is not directly recorded in the wireless log, it will be recorded by the network server on the router that establishes the relationship between a "dstip," a "device," and, where applicable, an authenticated "user." For example, one of the most common protocols that can generate an IP address for a particular device is called the Dynamic Host Configuration Protocol (DHCP)—a client/server protocol that automatically provides an IP host with its IP address and other related configuration information such as the subnet mask and default gateway.

In some embodiments, data processor 142 is operable to process the raw input data (Wi-Fi logs), obtain MAC addresses (e.g., from the raw input data or from the school's network server) and user identifiers (ID) when available (e.g., when authentication is available), and transform each log into an internal data structure (referred to herein as a WAL data set) with a particular set of attributes or data fields (e.g., a source network address, a destination network address, a client device address, a user ID, and a timestamp). To do so, data processor 142 is operable to extract values from attributes of interest (e.g., srcip, dstip, timestamp, MAC address, user ID, etc.) from each wireless log and generate a transformed WAL (a WAL data set) having the following fields for storing the extracted values:
Source_Address or SRCIP, Destination_Address or DSTIP, MAC_Address, User_Identifier or User_ID, Timestamp This internal data structure (a WAL data set) represents a relationship between a student and a physical location. It contains a precise time when a user device is connected to an AP and a device address that can be tied to a user (for example, through a user table stored in data store 146 used by platform 140 to keep track of a student's devices).

Since the AP belongs to a physical Wi-Fi router located on network 110, the WAL data set can be correlated to a particular longitude and latitude of the physical Wi-FI router (e.g., through an AP map provided by school admin 122 and stored on data store 146 that contains the geocodes of each AP of APs 120 on network 110). In some embodiments, values for additional data fields can be obtained and stored in a WAL data set and are not limited to the example data fields shown above.

For private networks (which are password protected and which require users to log in and authenticate using their credentials such as user IDs and passwords), the user ID would be in the raw input data (e.g., syslog 130) and thus can be discovered and extracted by data processor 142. A user ID can be in any suitable form, for instance, a combination of a student's first name and last name (e.g., "John.Doe"). However, for public networks where authentication is not implemented, such a user ID would not be in the raw input data.

To address this data scarcity problem (which is caused by an insufficient supply of user IDs in the raw input data), in some embodiments, data processor 142 is operable to investigate and correlate known pieces of information (e.g., MAC addresses, class schedules, times, etc.) to track down a user ID. To do so, data processor 142 first take all of the Wi-Fi logs available at an institution (e.g., syslog 130 from APs 120 of network 110 for the school), process them into WAL data sets, and store them into respective AP data sets in data store 146, each AP data set storing WAL data sets (transformed WALs) for a particular AP. FIG. 3 shows an example portion of an AP data set processed from Wi-Fi logs available at an institution.

As discussed above, and as illustrated in FIG. 3, each WAL data set contains a set of extracted values for a set of attributes of interest, including a MAC address and a timestamp, but may lack a user ID (because it was not in the raw input data). To determine a user ID associated with the MAC address, data processor 142 may traverse various data structures (e.g., tables, databases, etc.) in data store 146 and determine the user ID based on the relationships between the MAC address and other pieces of student information known to platform 140 (and hence known to data processor 142).

In some cases, student information and associated device information can be provided by the school (e.g., through school admin 122, which can be a specific data link to the school or an administrator) to platform 140. Platform 140 may maintain a user table (or user tables, each associated with a school campus) in data store 146 for storing student information provided by the school about each student of the school and their devices (which can include any Internet-enabled devices such as smart phones, laptops, gaming devices, health/sports tracking devices, etc.). As an example, each entry in such a user table can store a user ID for a student and the MAC addresses for the devices associated with the student.

When necessary (e.g., when user IDs could not be discovered and extracted from the raw input data), data processor 142 is operable to search the user table(s) in data store 146 for MAC addresses that match the MAC addresses discovered and extracted from the raw input data, determine user IDs from the user table(s) using the matching MAC addresses, and add the user IDs associated with the matching MAC addresses to the WAL data sets.

For unknown MAC addresses that cannot be matched to any student known to platform 140 (e.g., cannot be found in the user table(s) stored in data store 146), data processor 142 can correlate class schedules (which can be part of the student information provided by the school) with the WAL data sets. During a semester, each student has classes in particular buildings at particular times of the week. Class schedules are generally unique for each student. That is, no two students have the exact same class schedule. Thus, by comparing unknown MAC addresses appearing on campus (and showing up in the raw input data) with known student schedules stored in data store 146, data processor 142 can identify a particular student's class schedule and, from there, determine a specific student and thus the student's user ID. For example, if Jimmy has five classes, and the same MAC address X from the WAL data sets also exists in the same locations and at the same times as each of those five classes, the MAC address X is associated with Jimmy and Jimmy's user ID can be determined. In this way, data processor 142 can intelligently prepare WAL data sets for downstream computing facilities (e.g., student engagement analyzer 144) and enable platform 140 to accurately identify a user even when authentication is not available or possible.

In some embodiments, student engagement analyzer 144 can utilize certain attributes of the WAL data sets to construct a student behavior. As discussed above, a WAL data set represents a relationship between a student and a physical location or place. Here, a "place" is defined as a longitude and latitude coordinate associated with a college place such as the school building where a class is held, or a school event such as the orientation or counseling session, etc. Further, in this disclosure, a student behavior is defined by a place and time interval, such as time spent at the library, in the student housing (dorm), at the gym, or in the cafeteria, and so on. With place and time automatically and accurately associated with a student (e.g., through WAL data sets generated by data processor 142, as explained above), it is possible to understand how students move about the school, what school facilities they use, and when and how long they use those school facilities.

To aid this understanding, in some embodiments, student engagement analyzer 144 is operable to create behavior time tables. A behavior time table stores information for a particular behavior, for instance, when and how a student spends time at a particular place in the week. FIG. 4A is an example of a behavior time table created by student engagement analyzer 144 to store the day of the week and the start and end times when students are at a particular place.

In some cases, zones can be created to correspond to a student behavior. For example, student housing or residential halls may correspond to the residential behavior, school buildings where classes are held may correspond to the academics behavior, and places where students may socialize (e.g., an athletic center, a student union building, a cafeteria, etc.) may correspond to the community behavior. FIG. 4B is an example of a behavior zone table created by student engagement analyzer 144 to associate students with a certain student behavior through zones that correspond to that student behavior.

Figure 4C:
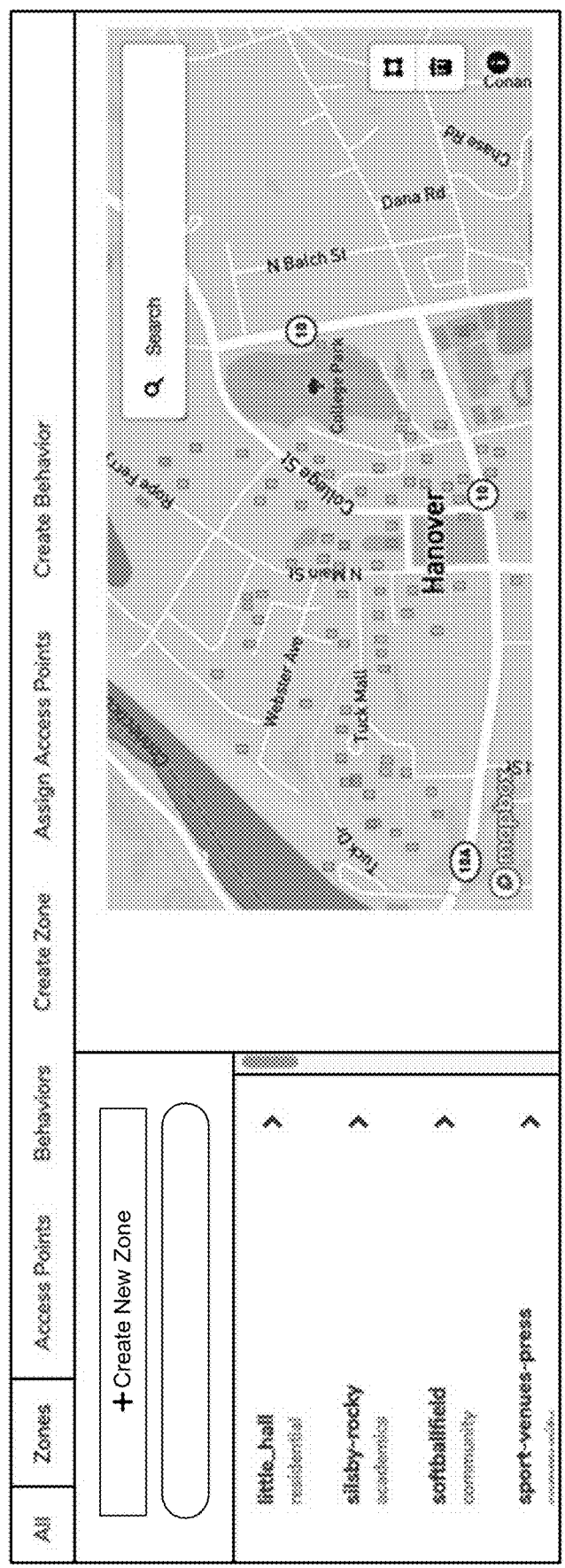
FIG. 4C depicts an example of a user interface generated by a student engagement and analytics platform component, the user interface showing assignment of zones corresponding to a behavior to a physical location according to some embodiments.
Figures 4D, 5:
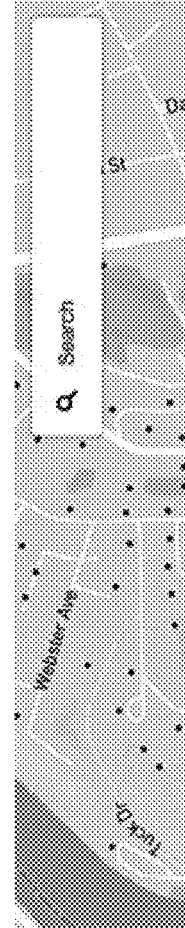
FIG. 4D depicts an example of a user interface generated by a student engagement and analytics platform component, the user interface showing assignment of access points to a physical location according to some embodiments.
FIG. 5 is an example of a class attendance table generated by a student engagement and analytics platform component according to some embodiments.

As illustrated in FIG. 4C, zones corresponding to a student behavior tracked by platform 140 can be assigned (e.g., visually through user interface 400 provided by platform 140) to a physical location. As illustrated in FIG. 4D, using a map coded with longitude and latitude coordinates, the physical location can be aligned or mapped to AP(s) at and/or near the physical location.

In this way, a student's location can be established at a precise time and at a particular physical location. The time and place information can objectively quantify or explain the student's behaviors (e.g., the student's class attendance). For example, if a wireless log exists for the student in the same building at the same time as a particular class was occurring, the student is given credit for attending the entire amount of hours of that class. FIG. 5 is an example of a class attendance table derived from WAL data sets by student engagement analyzer 144, representing a quantified explanation of a student's behavior with regard to class attendance.

Collectively, for all classes for all students, behaviors can be represented by student behavior variables such as: "hours_attended_class" and "total_hours_of_class." This calculation also adjusts for classes that did not occur, such as when there is a school break or when a class was cancelled. Some embodiments may include a variable called "productive_academic_minutes" for tracking hours that can be attributed towards positively achieving academic success. For example, this variable can be used by student engagement analyzer 144 to track a particular type of student behavior such as a student spending an hour in the library. In some embodiments, student engagement analyzer 144 is operable to analyze the WAL data sets prepared by data processor 142 and correlate the place and time information associated with a student into a variety of student behavior variables, such as "hours_attended_class," "total_hours_of_class," "social_minutes," "productive_academic_minutes," "exercise_minutes," "dorm_minutes", "cafeteria_minutes", etc.

In some embodiments, such student behavior variables can be used to build a student specific score to measure a student's engagement (referred to herein as "student engagement score" or SES). SESs can vary from student to student according to each student's environment such as the size of the school, the student's major, the student's housing choice (e.g., whether the student lives on or off campus), etc. To account for these differences, student behavior machine learning module 148 is operable to determine the importance of each behavior through ML techniques such as the multivariate linear regression where multiple correlated dependent variables can be predicted, rather than a single scalar variable. Multivariate linear regression is known to those skilled in the art and thus is not further described herein. In some embodiments, student behavior machine learning module 148 leverage this type of ML techniques to model the relationship between a dependent variable, namely, student retention, and explanatory or independent variables (e.g., "class-attendance"). Such a ML model allows student behavior machine learning module 148 to construct a relationship between daily student engagement features (e.g., student behavior variables) and overall student retention. As an example, this relationship can be expressed using a multivariate linear regression implementation (which solves for Betas and Epsilon).

$$Y = \sum_{i=0}^{n} X_i \beta_i + \varepsilon$$

where Y represents a student retention value, $X_i$ represent behavior values from WAL data sets, βs represent linear weights describing the relationship between student engagement features and overall student retention, and ε is a residual term which describes other factors not explained by student engagement features.

Solving for Y in the above equation (which describes a set of weighted student behaviors) produces a daily student engagement score specific for a student, representing the current overall student retention for the student. This student-specific student engagement score gives a timely and quantified insight into how a specific student is behaving on a campus on that day and can be used to track individual engagement as well as student group engagement. Student engagement scores thus generated by student behavior machine learning module 148 can be stored in data store 146 and utilized to track individual student engagement as well as student group engagement over time (e.g., a week, a month, a semester, etc.), generate student engagement reports (e.g., by report generator 154), and/or update dashboards in real time (e.g., by student engagement application 152), as discussed above.

In some embodiments, student behavior machine learning module 148 may implement econometric methods such as the autoregressive integrated moving average (ARIMA) model. ARIMA is known to those skilled in the art and thus is not further described herein. Utilizing the ARIMA forecasting modeling, in some embodiments, student behavior machine learning module 148 is operable to generate a forecast for each student behavior variable, using weekends, holidays, and school breaks as seasonal features. In this way, the future behaviors of a student can be predicted and an overall engagement score for that student can be generated.

As an example, ARIMA forecasting can be described by the following econometric formula showing an ARIMA (1,1,1) model as follows:

$$\left(1 - \sum_{i=1}^{p} \phi_i L^i\right)(1 - L)^d X_t = \left(1 + \sum_{i=1}^{q} \theta_i L^i\right)\varepsilon_t$$

where p, d, q represent the ARIMA process, phi is an autoregressive term, L is a lag operator, theta is a moving average term, and epsilon represents random shock (noise).

In some embodiments, ARIMA methods can be utilized to smooth a student's actual engagement over time and predict the student's future engagement. This ability to produce past, current, and predictive future student engagement scores provides a wide and diverse set of data that can be used to scale machine learning techniques for early detection of at-risk students for retention. An example is shown through user interface 600 of FIG. 6A.

Figure 6A:
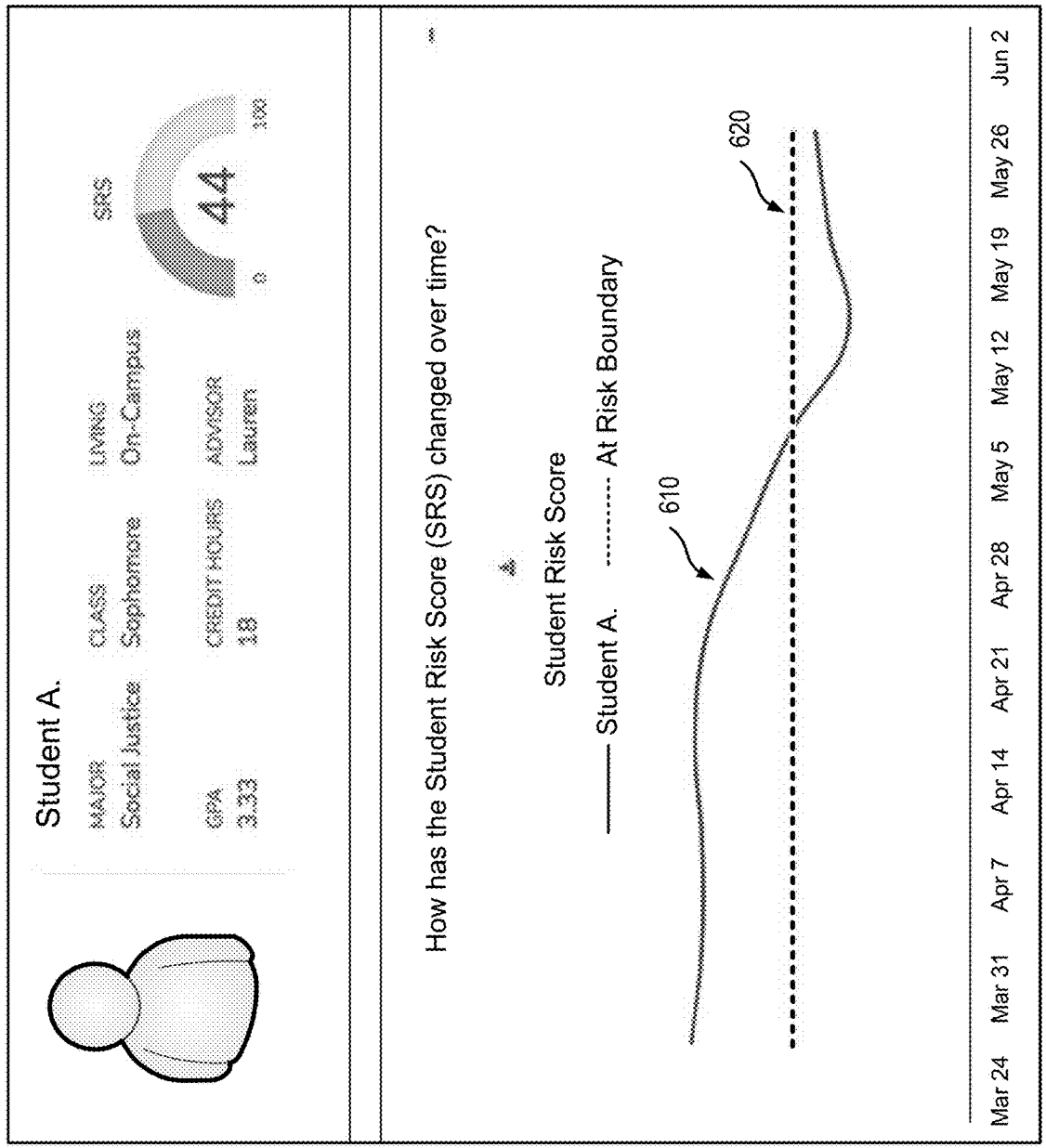
FIG. 6A depicts an example of a user interface generated by a student engagement and analytics platform component, the user interface showing a student's actual and predicted engagement over time according to some embodiments.

In the example of FIG. 6A, "Student A." currently has a GPA of 3.33. The current student engagement score (referred to as the student risk score (SRS) in FIG. 6A) is 44. This gives insight into how "Student A." is behaving. By comparing how "Student A." is behaving with how students have behaved in the past, student behavior machine learning module 148 is operable to learn and understand how "Student A." will behave in the future. In this case, output 610 (a smoothed student engagement curve specific for "Student A." based on quantified current and future behaviors of "Student A.") generated by student behavior machine learning module 148 shows that "Student A." is actually at risk of dropping out in the near future (e.g., when student engagement curve 610 falls below threshold 620, described below), despite the fact that "Student A." has a current GPA of 3.33. For school counselors and student advisors, this analytical outcome (i.e., at-risk student engagement detection as exemplified in FIG. 6A) provided by platform 140 may come as a surprise as a student with a GPA of 3.0 or above would have been considered as a "good" student and, generally, good students are not expected to drop out of school.

Figure 6B:
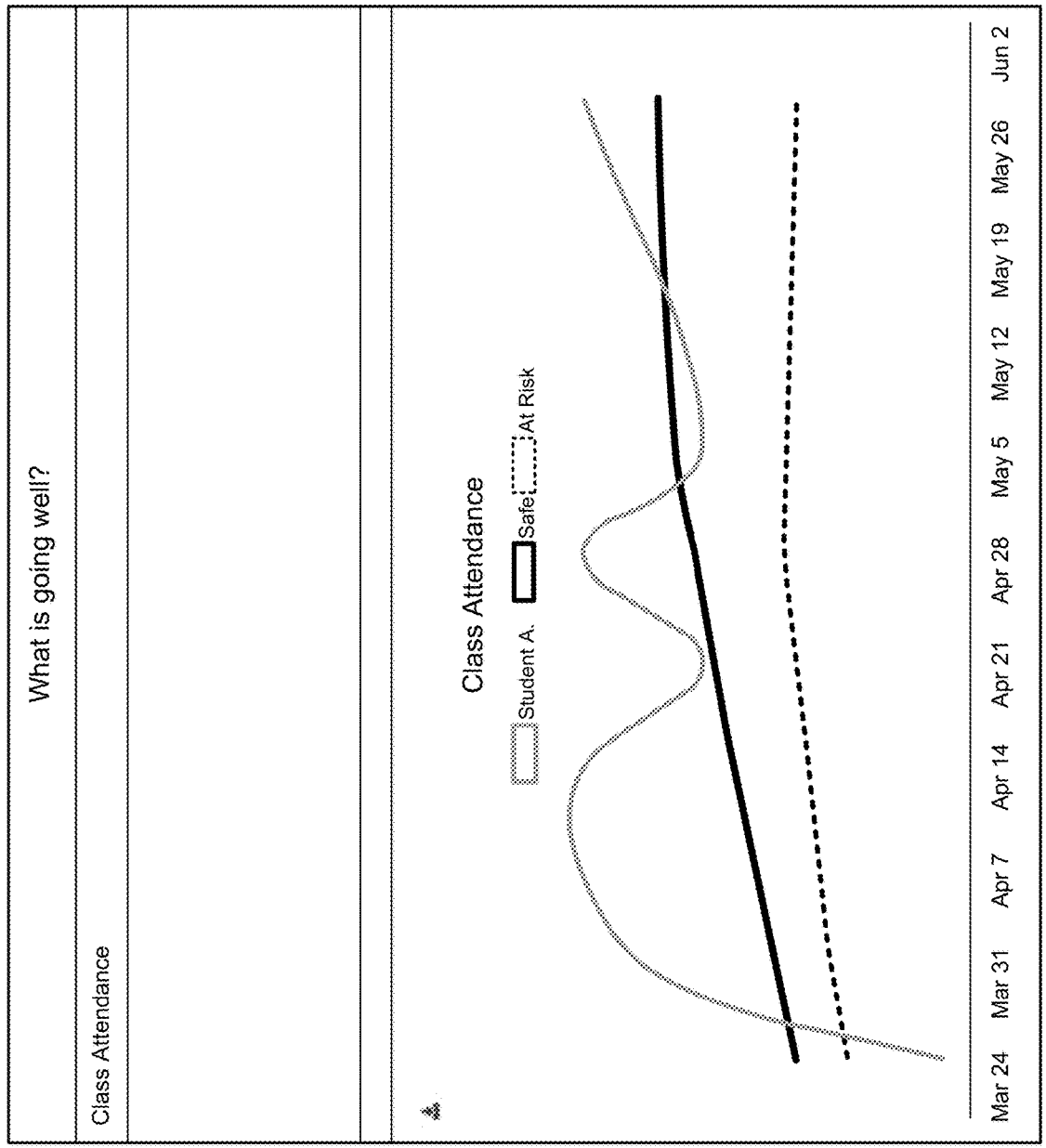
FIG. 6B depicts an example of a user interface generated by a student engagement and analytics platform component, the user interface illustrating a behavior-specific analytical output of a student's actual and predicted engagement with a school over time according to some embodiments.

In some embodiments, a behavior-specific analytical output of a student's actual and predicted engagement with a school over time can also be provided by platform 140 through the user interface. FIG. 6B depicts an example of a user interface generated by student engagement application 152. In the example of FIG. 6B, user interface 601 illustrates an analytical output generated by at-risk student engagement detector 150 that is specific to class attendance, which is one of the objective measures of student behaviors produced and tracked by platform 140. Specifically, a student's actual and predicted engagement with a school over time from the perspective of class attendance is shown as compared to past student behaviors such as "safe" and "at risk" toward the same student engagement feature. This gives viewers of user interface 601 (e.g., a school counselor, student adviser, coach, retention specialist, etc.) a much-needed insight into the student's particular behavior (in this case, class attendance).

Figure 6C:
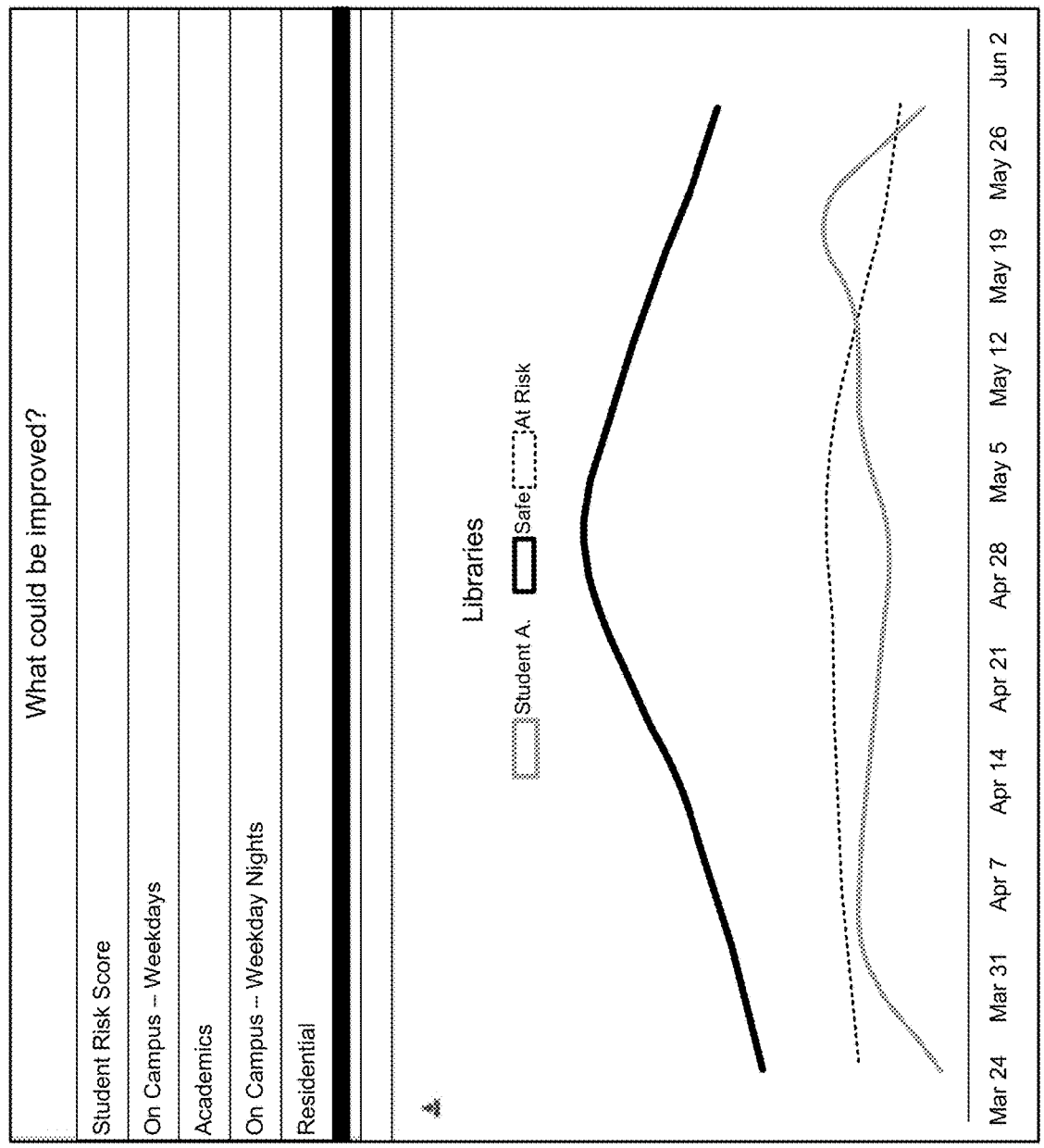
FIG. 6C depicts an example of a user interface generated by a student engagement and analytics platform component, the user interface presenting a list of student behaviors recommended for student retention improvement and an analytical output of a student's actual and predicted engagement over time with respect to a particular student behavior according to some embodiments.

Other student behaviors can be analyzed and presented through a user interface in a similar manner. In the example of FIG. 6C, user interface 605 shows an analytical output generated by at-risk student engagement detector 150 that is specific to a student's engagement behavior with regard to libraries. Similar to FIG. 6I, a student's actual and predicted engagement with a school's libraries over time is shown as compared to past student behaviors such as "safe" and "at risk" toward the same student engagement feature. In this case, user interface 605 further includes a list of student behaviors recommended for student retention improvement that is specific to the student. This gives viewers of user interface 605 (e.g., a school counselor, student adviser, coach, retention specialist, etc.) a helpful guidance on target specific student behaviors that may improve the overall student retention for that student.

As illustrated in FIG. 6A, in some embodiments, at-risk student engagement detection can be determined relative to at-risk student retention thresholds (e.g., threshold 620). Such at-risk student retention thresholds can be generated (e.g., by at-risk student engagement detector 150) using machine learning techniques with various features (ML model variables) derived from the current and predicted student engagement scores. In this disclosure, an at-risk student retention threshold is defined as a threshold point at which a student is considered at-risk.

In some embodiments, at-risk student engagement detector 150 is operable to perform analyses in several student engagement thresholding themes (methodologies), each of which determines whether a student is at risk or not. In some embodiments, examples of student engagement thresholding methodologies can include decision tree, logistic regression, and standard deviation outlier thresholding. These are further explained below.

Figure 7:
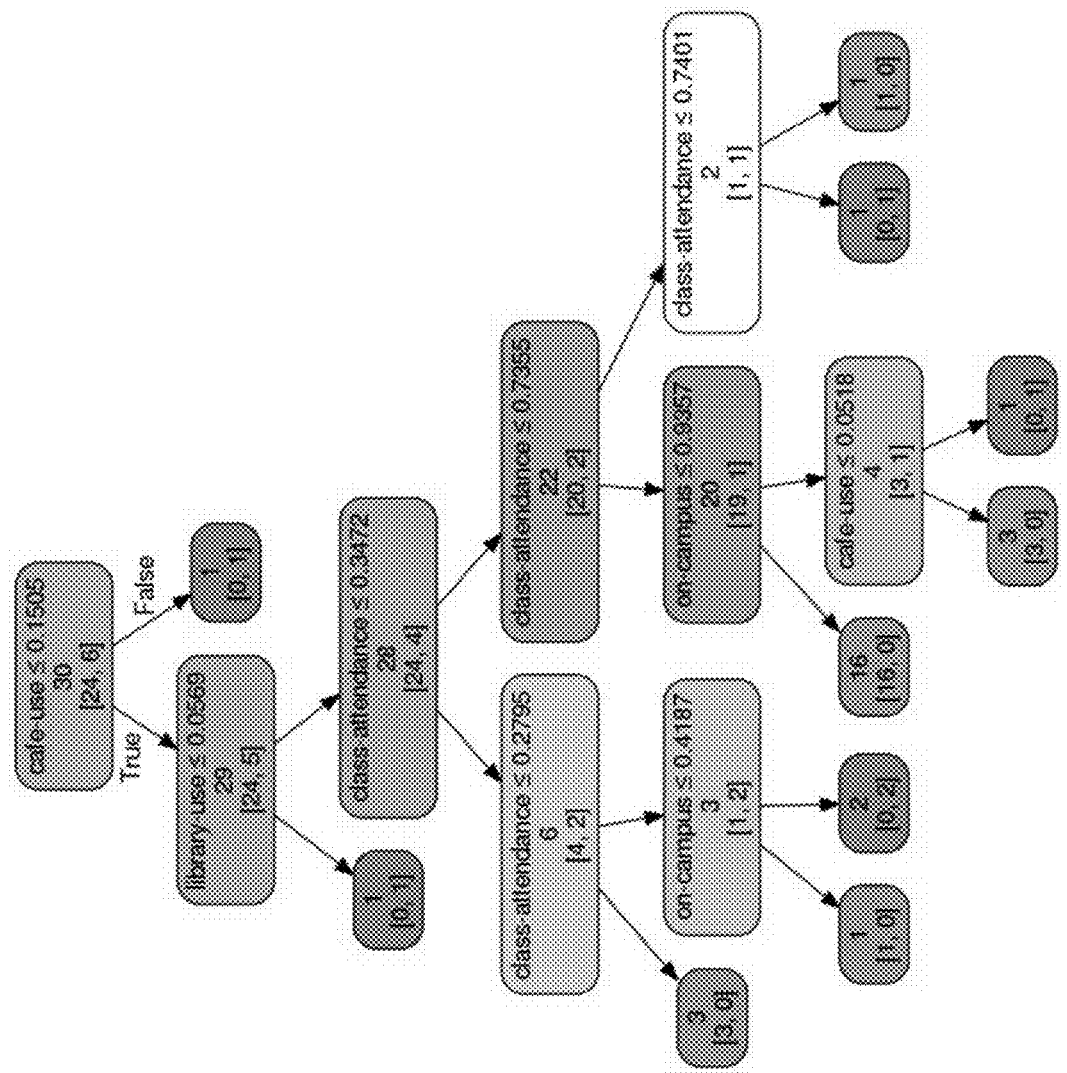
FIG. 7 is an example of a decision tree learning methodology that can be implemented on a student engagement and analytics platform to identify at-risk behavior according to some embodiments.

Decision Tree—Using the decision tree methodology, the most basic threshold can be created. FIG. 7 is an example decision tree that identifies at-risk behavior according to some embodiments. Skilled artisans appreciate that decision tree learning is one of the predictive modeling used in ML. In decision tree learning, a decision tree represents a predictive model in which a conclusion (represented in the leaf nodes of the decision tree) can be made through traversing different observations (e.g., WAL data sets, represented in the branches of the decision tree). As illustrate in FIG. 7, decision tree 700 is a tree-like graph or model of decisions and their possible consequences—for instance, "Does the student attend orientation?"; "Has the student missed the last five classes?"; and so on. FIG. 7 is one exemplary way to display a student engagement thresholding algorithm that contains only conditional control statements.

Figure 8:
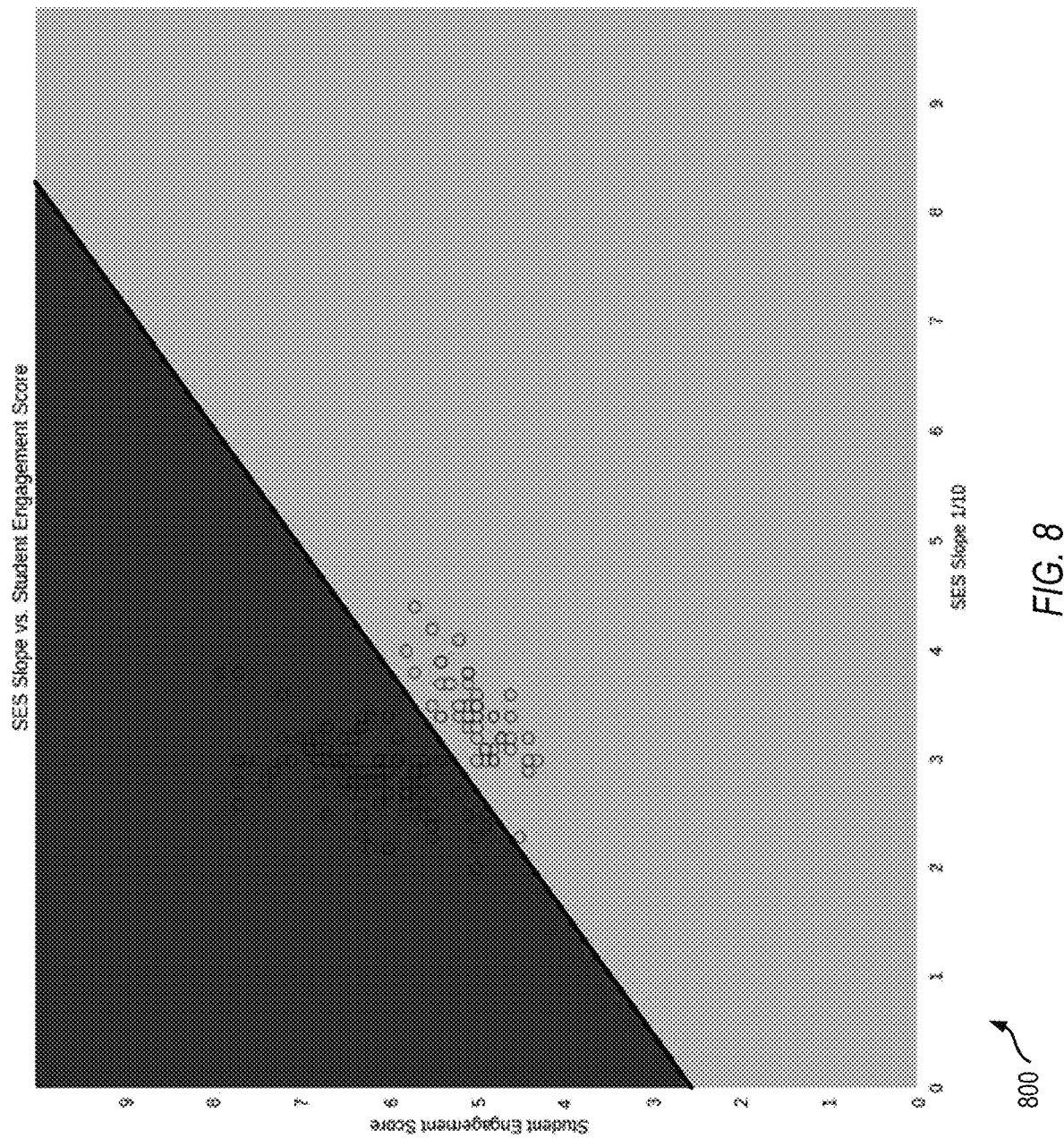
FIG. 8 is a plot diagram showing an example of a logistic regression classification technique that can be leveraged by a student engagement and analytics platform to determine a threshold for at-risk students according to some embodiments.

Logistic Regression—logistic regression is a statistical method for solving a classification problem. This method can be used to analyze a dataset (e.g., WAL data sets) in which there are one or more independent variables that determine an outcome. The outcome is measured with a dichotomous variable. This method is useful for estimating the probability of a binary response (i.e., a logistic regression only has two possible outcomes), for instance, whether or not a student is retained the next semester in college. FIG. 8 is a plot diagram showing an example of using a student's SES slope to determine a threshold for at-risk students. In this case, the slope coefficients (betas) represent the rate of change in the overall student retention, the dependent variable (Y), as the independent variables (X) change. Graphically, the student's SES slope represents a decision boundary of the binary outcome. Logistic regression is known to those skilled in the art and thus is not further described herein.

Figure 9:
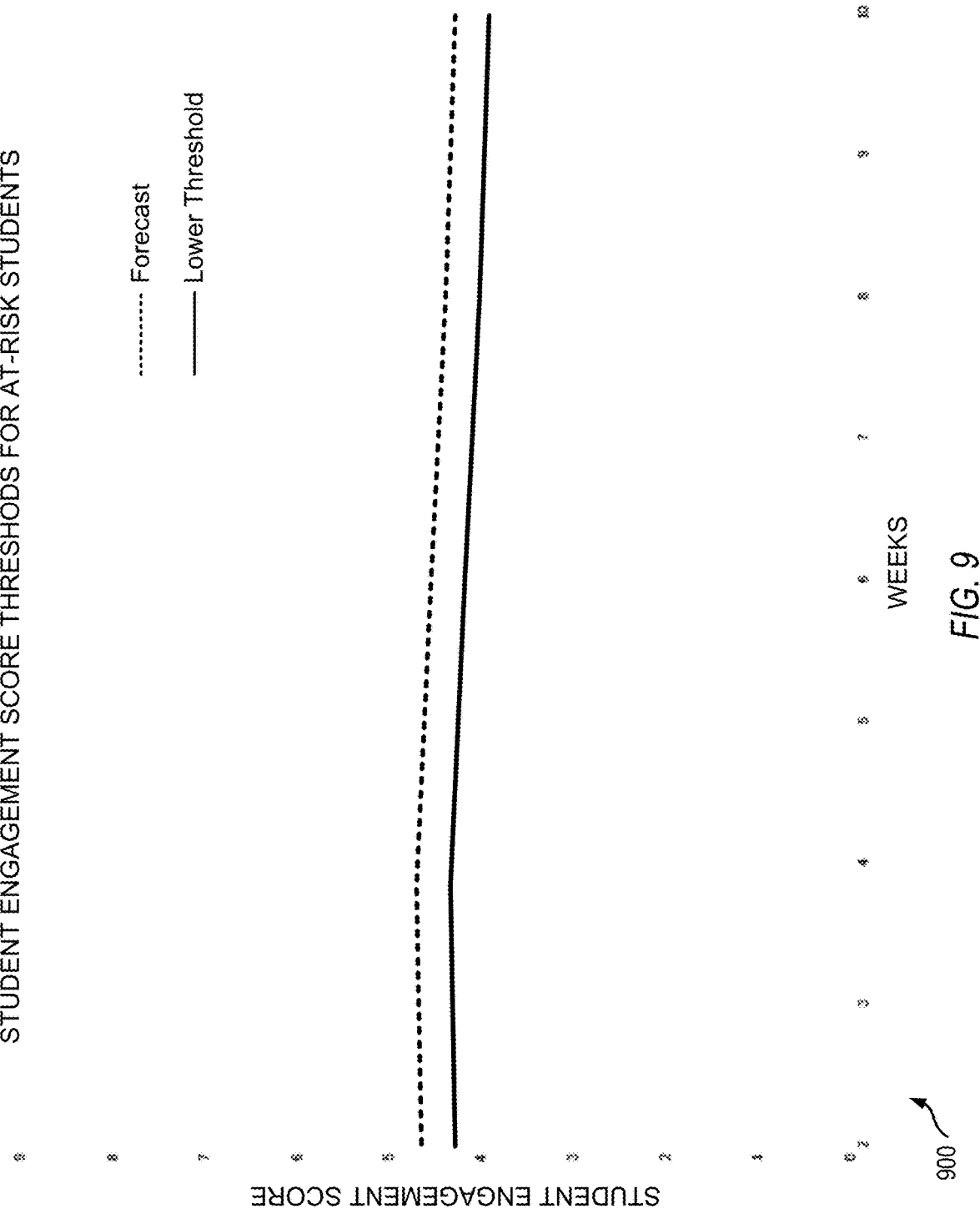
FIG. 9 is a plot diagram illustrating the lower bound standard deviation outlier produced by a standard deviation outlier threshold model using the standard deviation outlier threshold modeling methodology according to some embodiments.

Standard Deviation Outlier Threshold—This methodology can be leveraged to determine the lower standard deviation of each two-week sub time series of the term. The mean and standard deviation of the residuals are calculated and compared. Thresholds are outliers that fall outside of the lower bound standard deviation produced by the standard deviation outlier threshold model. An example is shown in FIG. 9. In this example, plot diagram 900 graphically represents the lower bound standard deviation produced by the standard deviation outlier threshold model. In this way, time periods where a student's behavior differs outside of the standard deviation can be identified. Standard deviation outlier threshold modeling is known to those skilled in the art and thus is not further described herein.

Figure 10A:
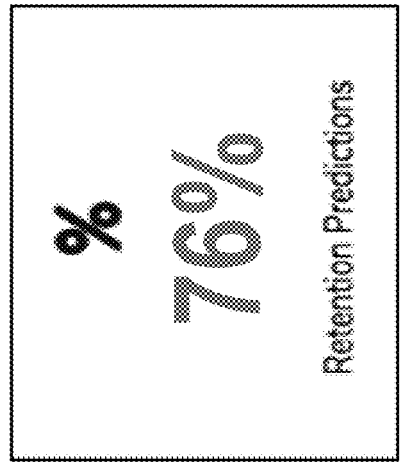
FIGS. 10A-10B depict a user interface exemplifying a student engagement report or dashboard generated by student engagement and analytics platform to present student group engagements that account for different subgroups of students having different behavioral patterns according to some embodiments.
Figure 10A:
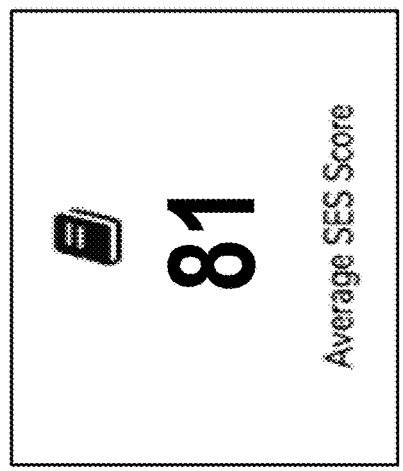
Figure 10A:
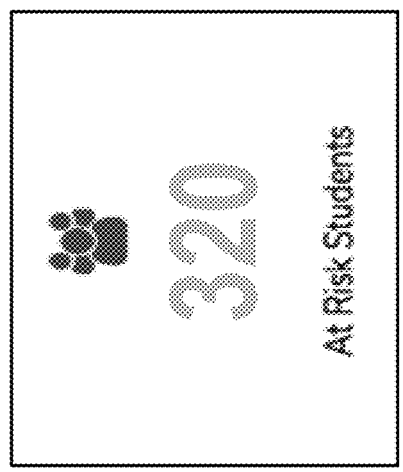
Figure 10A:
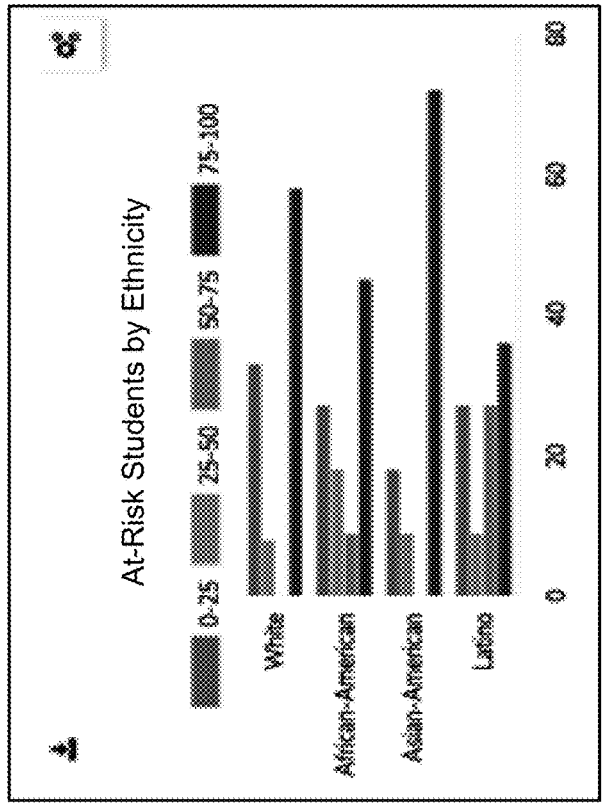
Figure 10A:
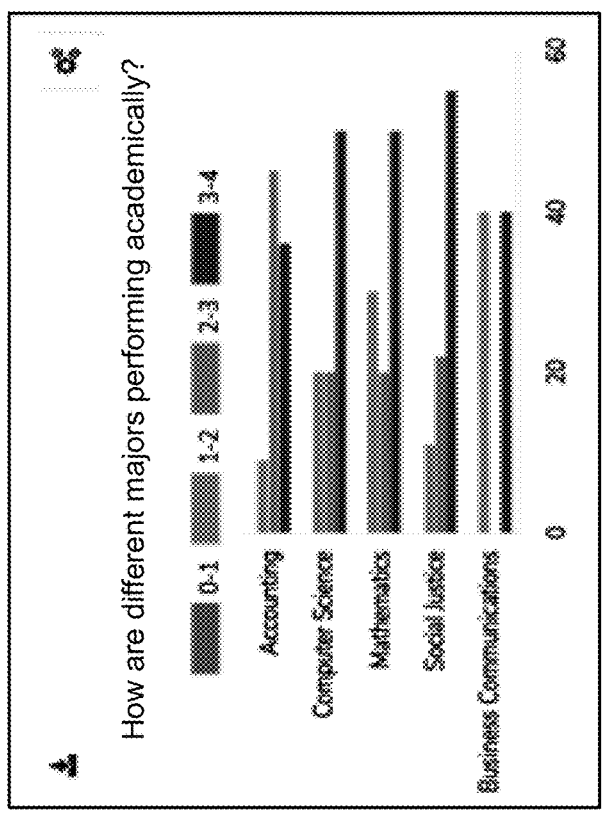
Figure 10B:
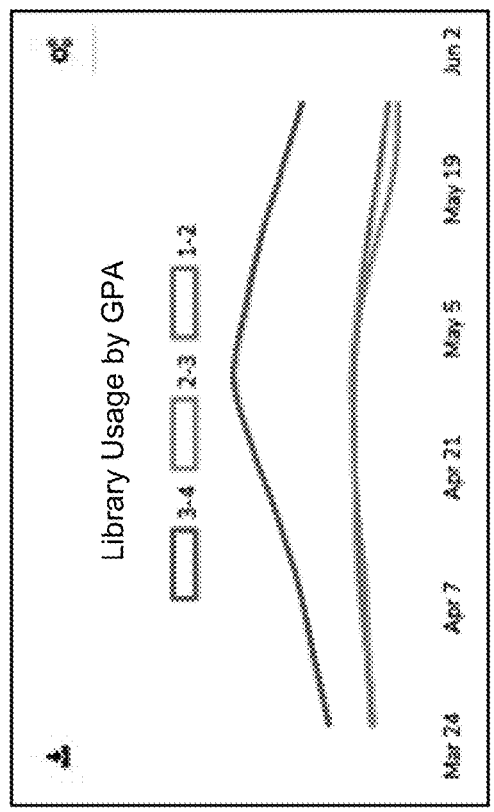
Figure 10B:
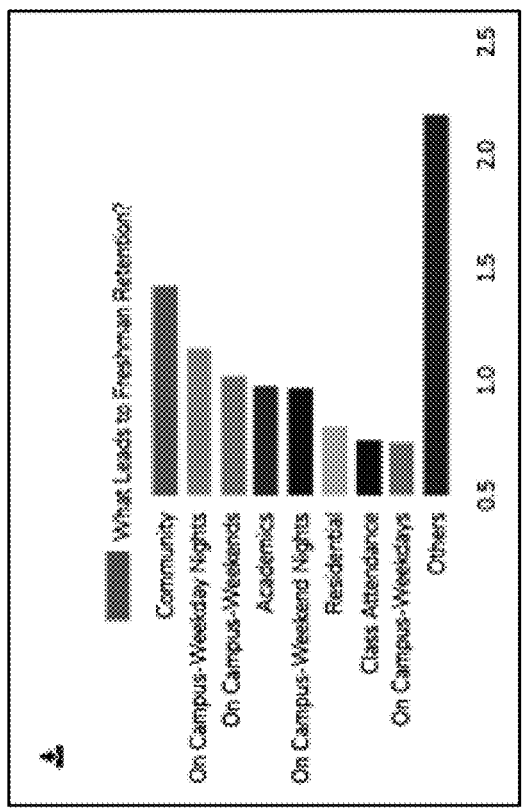
Figure 10B:
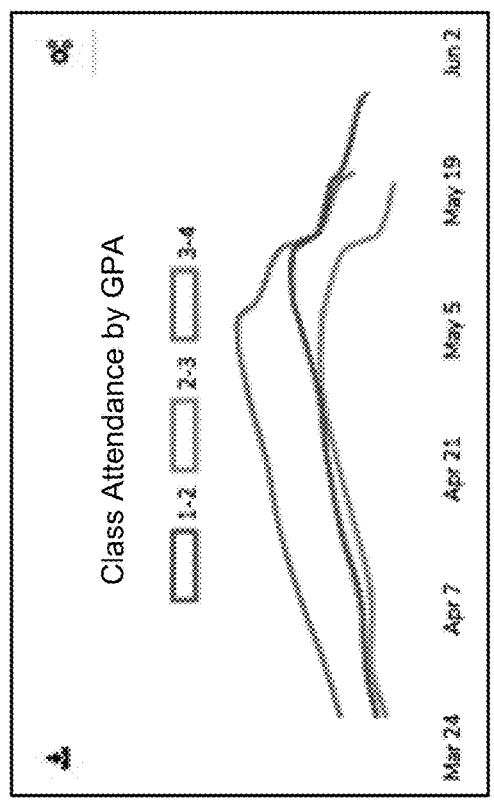
Figure 10B:
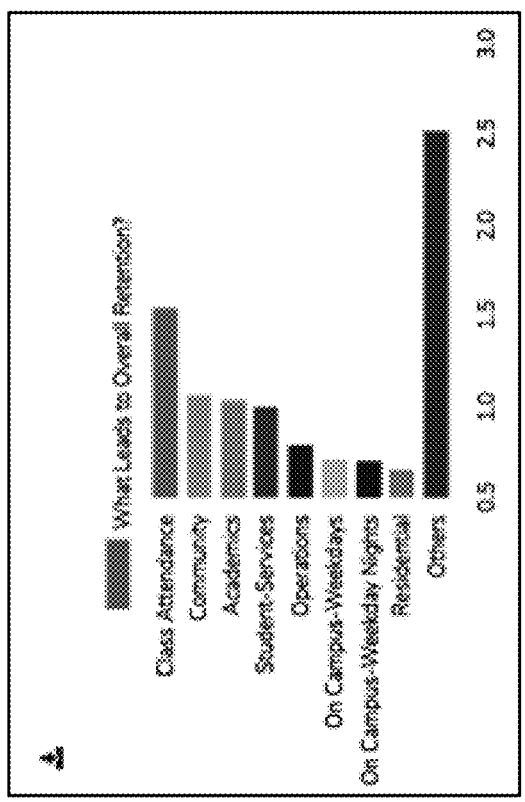

As discussed above, SESs generated by platform 140 can be utilized to track individual student engagement as well as student group engagement over time (e.g., a week, a month, a semester, etc.), generate student engagement reports, and/or update the dashboards student engagement application in real time. FIGS. 10A-10B depict user interface 1000 exemplifying a student engagement report generated by report generator 154 in some embodiments or dashboard 162 generated by student engagement application 152 in some embodiments.

As illustrated in FIGS. 10A-10B, students at a school can be in various subgroups (e.g., by major, by ethnicity, etc.) and different subgroups of students have different types of behaviors. User interface 1000 can visually present different types of student group engagements. As an example, an overall student group retention (Y) for a subgroup of students can be determined using objective measures specific to that subgroup (X), with their respective importance reflected in the weights (betas). In this case, a new X variable may be included to account for SESs for individual students in the subgroup. The same equation described above for generating an individual SES can then be used to describe a set of weighted student behaviors for the subgroup of students who, as a group, may have behaviors that are different from other subgroups. For example, students who live on campus may have very different experiences and behaviors versus students who commute. By combining previously mentioned techniques, decision trees, for example, may work with other models described above in order to understand which behaviors affect different types of students. For example, a student who is a first year "Political Science" major may have different behaviors of impact than a second year student, or a student in a different major and, therefore, SES functions may differ among students at the same school. Overall, this enables the system to adequately and objectively compare each student with the student's peers.

Other ways to represents analytical outputs from platform 140 are also possible. As another example, as illustrated in FIG. 10A, platform 140 may take an average of SESs generated for all the individual students at the school and present the average SES score through user interface 1000 to provide a timely and quantified insight as to how the study body, as a whole, is behaving. Additionally or alternatively, platform 140 may identify the total number of students considered by platform 140 as at risk of dropping out and present that finding through user interface 1000.

Figure 11:
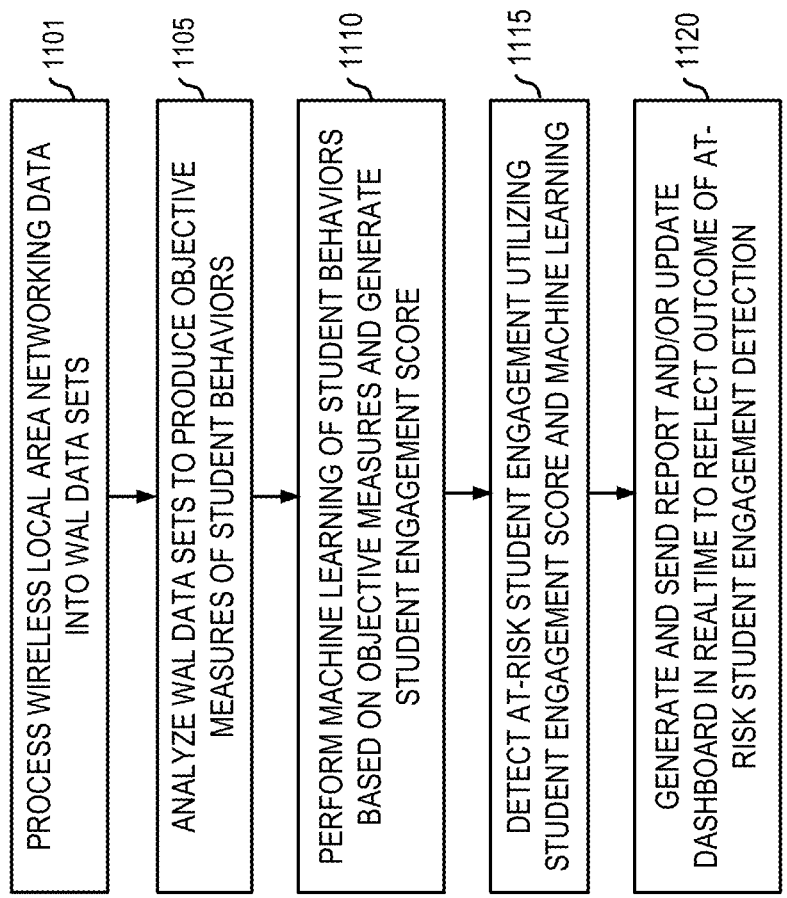
FIG. 11 is a flow chart illustrating an example of a student engagement method according to some embodiments.

Accordingly, as illustrated in FIG. 11, a student engagement method in some embodiments may include processing wireless local area networking data provided by a school to WAL data sets having an internal data structure (1101). The student engagement method can be implemented on a server computer or server computers operating on a student engagement and analytics platform such as platform 140 described above. The wireless local area networking data contains wireless logs from APs at a campus of the school. The processing can include transforming a wireless log into a WAL data set having a set of attributes of interest defined by the internal data structure. The data structure can be internal to a student engagement and analytics platform such as platform 140 described above. In some embodiments, the processing can include obtaining a MAC address from a network server on the school's network and including that MAC address in the WAL data set. In some embodiments, the processing can also include determining a user ID (e.g., when network authentication is not available and/or when the user ID cannot be found in the wireless logs) and including the user ID in the WAL data set.

In some embodiments, the student engagement method may further comprise analyzing the WAL data sets to produce objective measures of student behaviors (1105). In some embodiments, analyzing the WAL data sets may include correlating place and time information in the WAL data sets, associating them to a student and to a physical location, and generating a plurality of behavior tables. Each behavior table can be specific to a student behavior and thus can serve as an objective measure for that student behavior. Here, an objective measure of a student behavior quantifiably describes or explains the particular behavior of a specific student based on correlated time and place that place the student at a particular location for a length of time passively recorded by an AP through the student's wireless device.

In some embodiments, the student engagement method may further comprise performing machine learning of student behaviors utilizing the plurality of objective measures (1110). In some embodiments, performing machine learning of student behaviors may include constructing a multivariate linear regression model utilizing a set of student behavior variables. Here, the multivariate linear regression model represents a relationship between student engagement features (e.g., student behavior variables) and an overall student retention (e.g., SES) that reflects the current state of a student's engagement with a school. Accordingly, in some embodiments, performing machine learning of student behaviors may further include solving the multivariate linear regression model to obtain an SES specific to the student In some embodiments, performing machine learning of student behaviors may further include generating a forecast of future behaviors of the student utilizing an econometric method. In one embodiment, the econometric method comprises autoregressive integrated moving average modeling. In some embodiments, performing machine learning of student behaviors may further include solving an autoregressive integrated moving average model to obtain a forecast of future behaviors of the student over time. In some embodiments, the student engagement method may further comprise smoothing the student's actual and current engagement curve, adding the student's further engagement curve, generating a graph that combines the current (actual) and future (predicted) behaviors of the student, and presenting the graph through a user interface running on a client device communicatively connected to a computer server operating on the student engagement and analytics platform.

In some embodiments, the student engagement method may further comprise performing at-risk student engagement detection utilizing the SES and machine learning (1115). In some embodiments, performing at-risk student engagement detection may include comparing a student's actual and predicted engagement with past student behaviors. In some embodiments, this may entail determining appropriate at-risk student retention thresholds using machine learning (of past at-risk student engagement detection outcomes based on past student behaviors). Here, an at-risk student retention threshold defines a threshold point at which a student is considered at risk of dropping out. A determined at-risk student retention threshold can be specific to a student behavior and specific to the student under evaluation.

In some embodiments, the student engagement method may further comprise generating and sending a report to notify a user an outcome from the at-risk student engagement detection. This can be done on a daily, weekly, or monthly basis. Additionally or alternatively, the student engagement method may further comprise updating a dashboard of a student engagement application with the outcome from the at-risk student engagement detection in real time.

The student engagement application can be hosted on the student engagement and analytics platform, implemented as a web application, or delivered to the user's device(s) as a service. The student engagement and analytics platform can be hosted in a cloud computing environment or installed on-premises of an enterprise. Other implementations are also possible.

Through the process of analyzing large sets of local area networking data logs, deriving behaviors, and performing machine learning processes, embodiments disclosed herein can intelligently, timely, and objectively identify at-risk students, including previously hidden students who are actually at risk of dropping out, despite of their high GPAs.

Figure 12:
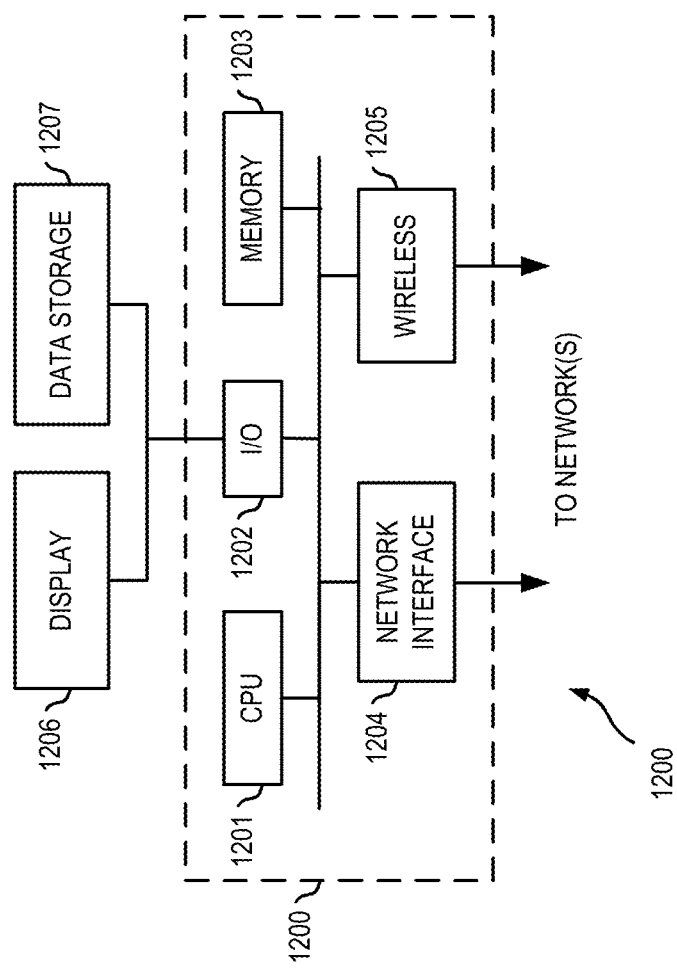
FIG. 12 depicts a diagrammatic representation of a data processing system for implementing a student engagement and analytics system disclosed herein according to some embodiments.

FIG. 12 depicts a diagrammatic representation of a data processing system for implementing a student engagement and analytics system disclosed herein. As shown in FIG. 12, data processing system 1200 may include one or more central processing units (CPU) or processors 1201 coupled to one or more user input/output (I/O) devices 1202 and memory devices 1203. Examples of I/O devices 1202 may include, but are not limited to, keyboards, displays, monitors, touch screens, printers, electronic pointing devices such as mice, trackballs, styluses, touch pads, or the like. Examples of memory devices 1203 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1200 can be coupled to display 1206, information device 1207 and various peripheral devices (not shown), such as printers, plotters, speakers, etc. through I/O devices 1202. Data processing system 1200 may also be coupled to external computers or other devices through network interface 1204, wireless transceiver 1205, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
   processing wireless local area networking data into data sets having an internal data structure, the wireless local area networking data passively collected by wireless access points of a school, the processing performed by a server computer operating on a student engagement and analytics platform;
   analyzing the data sets to produce objective measures of student behaviors specific to a student of the school, the analyzing performed by the server computer and comprising:
      correlating place and time information in the data sets specific to the student;
      associating the place and time information to a student identifier of the student and to a longitude and latitude coordinate of a physical location at the school; and
      generating a plurality of behavior tables, each behavior table of the plurality of behavior tables representing an objective measure of a student behavior;
   performing, by the server computer, machine learning of student behaviors utilizing the plurality of behavior tables, the performing comprising:
      constructing a multivariate linear regression model utilizing a set of student behavior variables;
      solving the multivariate linear regression model to obtain an actual student engagement score representing an overall student retention of the student; and
      generating a forecast of future behaviors of the student utilizing the actual student engagement score;
   performing, by the server computer, at-risk student engagement detection utilizing the actual student engagement score, the at-risk student engagement detection comprising:
      determining at-risk student retention thresholds using machine learning; and
      determining an at-risk student engagement detection outcome utilizing the at-risk student retention thresholds; and updating a user interface on a client device in real time to include the at-risk student engagement detection outcome.

2. The method according to claim 1, wherein the internal data structure is internal to the student engagement and analytics platform and has a set of attributes, the set of attributes including at least a source network address, a destination network address, and a timestamp.

3. The method according to claim 1, wherein the processing further comprises obtaining a media access control address from a network server of the school and storing the media access control address in a data set.

4. The method according to claim 1, wherein the processing further comprises, responsive to the student identifier not found in the wireless local area networking data provided by the school, determining the student identifier by correlating a media access control address and timestamps found in the wireless local area networking data provided by the school with a class schedule associated with the student, the class schedule containing the student identifier.

5. The method according to claim 1, wherein generating a forecast of future behaviors of the student comprises: constructing an autoregressive integrated moving average model; and solving the autoregressive integrated moving average model to obtain a forecast of future behaviors of the student over time.

6. The method according to claim 1, wherein determining at-risk student retention thresholds comprises utilizing at least one of decision tree learning, logistic regression modeling, or standard deviation outlier threshold modeling.

7. The method according to claim 1, further comprising:
generating a report containing an outcome of the at-risk student engagement detection; and
delivering the report to the client device through a student engagement application or an email.

8. A student engagement and analytics system, comprising:
a processor;
a non-transitory computer-readable medium; and
stored instructions translatable by the processor to perform:
processing wireless local area networking data into data sets having an internal data structure, the wireless local area networking data passively collected by wireless access points of a school;
analyzing the data sets to produce objective measures of student behaviors specific to a student of the school, the analyzing comprising:
correlating place and time information in the data sets specific to the student;
associating the place and time information to a student identifier of the student and to a longitude and latitude coordinate of a physical location at the school; and
generating a plurality of behavior tables, each behavior table of the plurality of behavior tables representing an objective measure of a student behavior;
performing, by the server computer, machine learning of student behaviors utilizing the plurality of behavior tables, the performing comprising:
constructing a multivariate linear regression model utilizing a set of student behavior variables;
solving the multivariate linear regression model to obtain an actual student engagement score representing an overall student retention of the student; and
generating a forecast of future behaviors of the student utilizing the actual student engagement score;
performing, by the server computer, at-risk student engagement detection utilizing the actual student engagement score, the at-risk student engagement detection comprising:
determining at-risk student retention thresholds using machine learning; and
determining an at-risk student engagement detection outcome utilizing the at-risk student retention thresholds; and
updating a user interface on a client device in real time to include the at-risk student engagement detection outcome.

9. The system of claim 8, wherein the internal data structure is internal to the student engagement and analytics platform and has a set of attributes, the set of attributes including at least a source network address, a destination network address, and a timestamp.

10. The system of claim 8, wherein the processing further comprises obtaining a media access control address from a network server of the school and storing the media access control address in a data set.

11. The system of claim 8, wherein the processing further comprises, responsive to the student identifier not found in the wireless local area networking data provided by the school, determining the student identifier by correlating a media access control address and timestamps found in the wireless local area networking data provided by the school with a class schedule associated with the student, the class schedule containing the student identifier.

12. The system of claim 8, wherein generating a forecast of future behaviors of the student comprises: constructing an autoregressive integrated moving average model; and solving the autoregressive integrated moving average model to obtain a forecast of future behaviors of the student over time.

13. The system of claim 8, wherein determining at-risk student retention thresholds comprises utilizing at least one of decision tree learning, logistic regression modeling, or standard deviation outlier threshold modeling.

14. The system of claim 8, where in the stored instructions are further translatable by the processor to perform:
generating a report containing an outcome of the at-risk student engagement detection; and
delivering the report to the client device through a student engagement application or an email.

15. A computer program product comprising a non-transitory computer-readable medium storing instructions translatable by a server operating on a student engagement and analytics platform to perform:
processing wireless local area networking data into data sets having an internal data structure, the wireless local area networking data passively collected by wireless access points of a school;
analyzing the data sets to produce objective measures of student behaviors specific to a student of the school, the analyzing comprising:
correlating place and time information in the data sets specific to the student;
associating the place and time information to a student identifier of the student and to a longitude and latitude coordinate of a physical location at the school; and
generating a plurality of behavior tables, each behavior table of the plurality of behavior tables representing an objective measure of a student behavior;

performing, by the server computer, machine learning of student behaviors utilizing the plurality of behavior tables, the performing comprising:
constructing a multivariate linear regression model utilizing a set of student behavior variables;
solving the multivariate linear regression model to obtain an actual student engagement score representing an overall student retention of the student; and
generating a forecast of future behaviors of the student utilizing the actual student engagement score;
performing, by the server computer, at-risk student engagement detection utilizing the actual student engagement score, the at-risk student engagement detection comprising:
determining at-risk student retention thresholds using machine learning; and
determining an at-risk student engagement detection outcome utilizing the at-risk student retention thresholds; and
updating a user interface on a client device in real time to include the at-risk student engagement detection outcome.

16. The computer program product of claim 15, wherein the internal data structure is internal to the student engagement and analytics platform and has a set of attributes, the set of attributes including at least a source network address, a destination network address, and a timestamp.

17. The computer program product of claim 15, wherein the processing further comprises obtaining a media access control address from a network server of the school and storing the media access control address in a data set.

18. The computer program product of claim 15, wherein the processing further comprises, responsive to the student identifier not found in the wireless local area networking data provided by the school, determining the student identifier by correlating a media access control address and timestamps found in the wireless local area networking data provided by the school with a class schedule associated with the student, the class schedule containing the student identifier.

19. The computer program product of claim 15, wherein generating a forecast of future behaviors of the student comprises: constructing an autoregressive integrated moving average model; and solving the autoregressive integrated moving average model to obtain a forecast of future behaviors of the student over time.

20. The computer program product of claim 15, where in the instructions are further translatable by the server computer to perform:
generating a report containing an outcome of the at-risk student engagement detection; and
delivering the report to the client device through a student engagement application or an email.

* * * * *